United States Patent [19]
Nagel

[11] Patent Number: 5,311,189
[45] Date of Patent: May 10, 1994

[54] METHOD FOR DISTINGUISHING BETWEEN AT LEAST TWO TARGETS

[75] Inventor: Dieter Nagel, Ulm-Wiblingen, Fed. Rep. of Germany

[73] Assignee: Deutsche Aerospace AG, Munich, Fed. Rep. of Germany

[21] Appl. No.: 946,571

[22] Filed: Sep. 18, 1992

[30] Foreign Application Priority Data

Sep. 19, 1991 [DE] Fed. Rep. of Germany ....... 4131141

[51] Int. Cl.$^5$ ...................... G01S 13/534; G01S 13/53
[52] U.S. Cl. .................................... 342/95; 342/102; 342/162; 342/196
[58] Field of Search ................... 342/89, 90, 91, 94, 342/95, 102, 101, 127, 159, 160, 161, 162, 194, 195, 196

[56] References Cited

U.S. PATENT DOCUMENTS

| | | | |
|---|---|---|---|
| 3,706,989 | 12/1972 | Taylor, Jr. | 342/94 |
| 3,737,900 | 6/1973 | Vehrs, Jr. | 342/102 |
| 3,976,999 | 8/1976 | Moore et al. | 342/90 |
| 4,012,740 | 3/1977 | Lenneper | 342/428 |
| 4,308,538 | 12/1981 | Albersheim | 342/80 |
| 4,377,811 | 3/1983 | Mooney, Jr. et al. | 342/94 |
| 4,454,511 | 6/1984 | Peters | 342/89 |
| 4,536,764 | 8/1985 | Freeman | 342/91 |
| 4,656,480 | 4/1987 | Allezard et al. | 342/151 |
| 4,714,927 | 12/1987 | Siegel et al. | 342/160 |
| 4,960,329 | 10/1990 | Schofield | 356/5 |
| 5,128,679 | 7/1992 | Moffat | 342/13 |
| 5,227,801 | 7/1993 | Pierce | 342/192 |

FOREIGN PATENT DOCUMENTS 3620734 6/1986 Fed. Rep. of Germany .

Primary Examiner—John B. Sotomayor
Attorney, Agent, or Firm—Spencer, Frank & Schneider

[57] ABSTRACT

The present invention relates to a pulse Doppler radar wherein the phase position of the reflected signals is evaluated as the most important component in addition to the amplitude. Thus a very good resolution results in the range direction and in the velocity direction for the detection of multiple target situations. The invention can be employed particularly for a so-called HPRF radar.

8 Claims, 12 Drawing Sheets $T_{tx} = \dfrac{\ln 2}{\pi B_{tx}}$

AMPLITUDE EVALUATION
(MULTIPLE TARGET CONDITION)

2 SAMPLING VALUES

3 SAMPLING VALUES

4 SAMPLING VALUES

ADDITIONAL PHASE EVALUATION

METHOD FOR DISTINGUISHING BETWEEN AT LEAST TWO TARGETS

BACKGROUND OF THE INVENTION

1. Field of The Invention

The present invention relates to a method for distinguishing between at least two targets with the aid of a pulse Doppler radar, with the radar signals reflected from at least one target being evaluated with respect to their distance direction and/or their velocity direction whereupon a conclusion is drawn as to the existence of one or a plurality of targets.

2. Background Information

The term pulse Doppler radar employed in this application also includes the terms pulse Doppler radar system and pulse Doppler radar device.

A pulse Doppler radar can be constructed in a space-saving, compact manner. It is therefore usable in many ways as a socalled on-board radar in land vehicles and aircraft. For such uses it is desirable to have a transmit/receive antenna which has the smallest possible surface area (aperture). However, such a system is able only to accurately determine either the distance or the velocity of a target, for example a land vehicle or an aircraft. If distance and velocity of a target are to be determined simultaneously, this is possible only at the expense of the otherwise attainable maximum accuracies. These facts correspond to the determination that, if the distance and velocity of a target are determined simultaneously with the aid of a pulse Doppler radar, the resolution of the latter in the distance direction and in the velocity direction is reduced with respect to corresponding individual measurements. Therefore, resolution limits exist in the distance direction and in the velocity direction below which multiple targets cannot be discovered. The resolution limit in the distance direction or in the velocity direction is characterized in that, with a certain probability, two targets at the same Doppler velocity can be distinguished separately in the distance direction or, at the same distance, in the velocity direction.

The most important values for the resolution limits of a pulse Doppler radar are, among others, the pulse repetition frequency PRF, the length of the Fast Fourier transform $N_{FFT}$ employed, the sampling time $T_a$ and the length of the transmitted pulse $T_{rx}$. With presently customary methods, for example, the so-called "valley sensing" method, in which a relative minimum between two maxima is located in the signal characteristic as the resolution criterion, resolution values are obtained with a probability of 50% which correspond approximately to 1.5 to 2 times the quantization steps in the measurement scale. In these methods, only the amplitude of the signal characteristic is employed to resolve two targets.

SUMMARY OF THE INVENTION

It is an object of the present invention to solve the drawbacks in a method of this type so that, for a simultaneous determination of the distance and the velocity of a target, the associated resolution limits are considerably reduced.

This is accomplished by a method in which the phase position of the radar signal reflected from at least one target is evaluated, an average phase position for the adjacent filter or the adjacent range gate, respectively, is determined therefrom, the deviations of the phase position of the adjacent filter or the adjacent range gate, respectively, from the previously calculated average phase position are determined, and a multiple target situation is considered to exist if the deviations of the phase.

Further advantageous features and/or modifications to the above method according to the invention will be described in the detailed description. According to one embodiment of the invention, the threshold value is formed as a function of the signal to noise ratio of the received signal after it passes through a weighting filter. According to a further embodiment, the weighting filter is configured as a Gaussian filter. In another embodiment, an average phase position for each Doppler range is formed in the adjacent Doppler filter. In a further embodiment of the invention, an average phase position for each range gate is formed in the adjacent range gate.

In a further embodiment of the invention, in addition to the amplitude values, the deviations of the phase positions with respect to the average phase positions are evaluated and, if an associated threshold is exceeded, the conclusion is drawn that a multiple target situation exists. In another embodiment, the pulse Doppler radar operates according to the High Pulse Repetition Frequency (HPRF) mode and the phase of its received signals is evaluated. In another embodiment of the invention, the pulse Doppler radar is configured for use as an on-board radar in an aircraft.

One advantage of the invention is that the resolution limits for a simultaneous determination of range and velocity of a target lie substantially below those resulting from comparable individual measurements with conventional methods, that is, with an HPRF method for a determination of the distance and a Low Pulse Repetition Frequency (LPRF) method for a determination of the velocity of a target.

The invention is based on evaluating, in a pulse Doppler radar, the phase position of the signal reflected from one or several targets.

BRIEF DESCRIPTION OF THE DRAWINGS

The invention will now be described in greater detail with the aid of embodiments thereof and with reference to the schematic illustrations of FIGS. 1 to 23 in which.

DETAILED DESCRIPTION OF THE PREFERRED EMBODIMENTS

Figure 1:
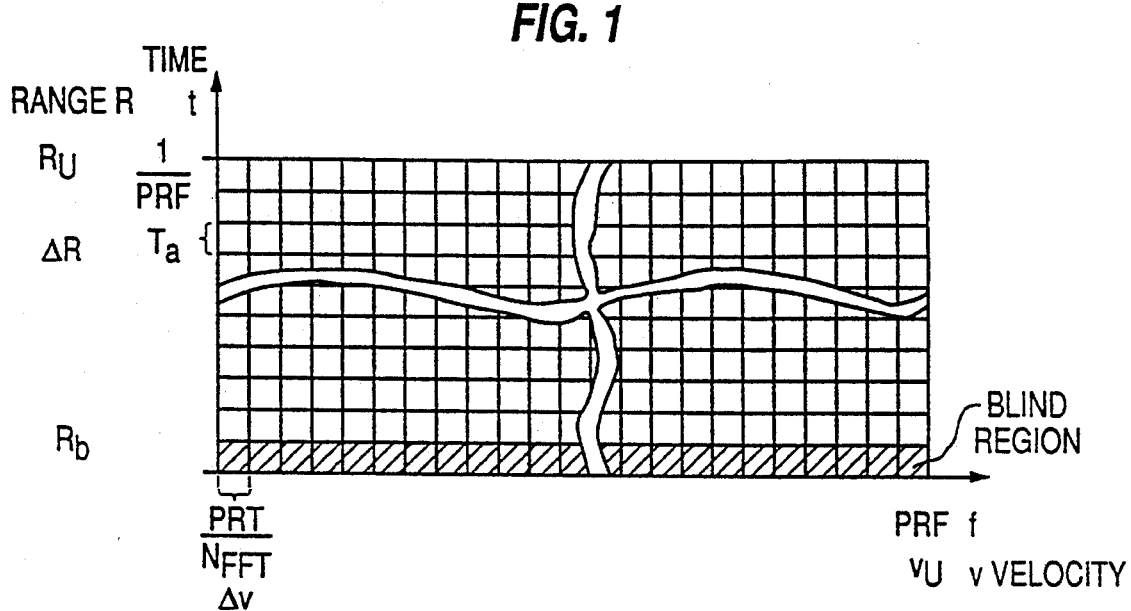
FIG. 1 is a range doppler matrix plotting sampling values in a pulse Doppler radar.

In a pulse Doppler radar, the received signal is demodulated with a signal corresponding to the transmitting frequency and is ultimately sampled in synchronism with the pulse repetition frequency (PRF). The resulting sampling values can be arranged as shown in FIG. 1 in a range doppler matrix. The Doppler frequency f up to the pulse repetition frequency PRF as well as the corresponding velocity v up to the maximum velocity $v_u$ can be plotted on the first abscissa. The spacing of the lines on the abscissa corresponds to the values $PRF/N_{FFT}$ and $\Delta v$, respectively. The time t up to the time 1/PRF as well as the range R up to the distance $R_u$ can be plotted on the second abscissa. The spacing of the lines on the second abscissa corresponds to the sampling time $T_a$ and the range $\Delta R$, respectively. In the range direction there results the blind region $R_b$ shown by hatching.

The unambiguous region in the Doppler direction is determined by the pulse repetition frequency PRF. Accordingly, the measuring accuracy is here $PRF/N_{FFT}$. The reciprocal pulse repetition frequency 1/PRF determines the unambiguousness region in the range direction while now the measuring accuracy is given by the sampling time $T_a$. Since it is not possible to receive during the transmit phases, the radar is blind in the ambiguous distance range from 0 to $R_b$ which is indicated in FIG. 1 by a hatched area.

By way of the wavelength λ of the transmitting frequency and the speed of light c, the frequency and time values shown in FIG. 1 have the following relationships with the physical values to be measured, namely velocity and distance:

$$\text{unambiguous range } R_u = \frac{c}{2 \cdot PRF} \quad (2.1)$$

$$\text{unambiguous velocity } v_u = \frac{\lambda \cdot PRF}{2}$$

$$\text{measuring accuracy for range } \Delta R = \frac{cT_a}{2}$$

$$\text{measuring accuracy for velocity } \Delta v = \frac{\lambda \cdot PRF}{2N_{FFT}}$$

In an exemplary pulse Doppler radar operating according to the so-called HPRF velocity search mode, the following limits apply for the sampling time $T_a$, the pulse repetition frequency PRF and the wavelength λ:

$$T_a \geqq 0.500 \, \mu sec$$

$$200.000 \text{ kHz} \leqq PRF \leqq 250.000 \text{ kHz}$$

$$3.5 \text{ cm} \leqq \lambda \leqq 4.0 \text{ cm}$$

Correspondingly, the following is obtained for the measuring accuracies ΔR and Δv, $N_{FFT}=2040$:

$$\Delta R \geqq 75 \text{ m}$$

$$1.709 \text{ m/s} \leqq \Delta v \leqq 2.441 \text{ m/s}$$

The unambiguous areas for the distance and for the velocity then lie at the following values:

$$0.600 \text{ km} \leqq R_u \leqq 0.750 \text{ km}$$

$$3500 \text{ m/s} \leqq v_u \leqq 5000 \text{ m/s}$$

Figure 2:
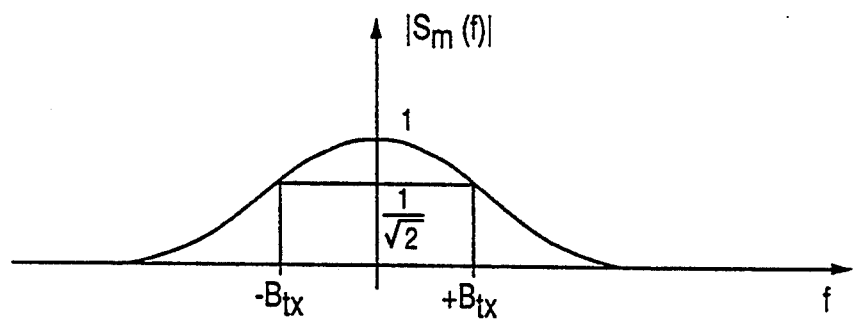
FIG. 2 is a frequency spectrum for a input matched filter (Gaussian filter)

The signal characteristic which determines the resolution limits in the time domain is essentially determined by the socalled matched filter provided in the input region of the receiving branch. The matched filter is here set to approach a Gaussian curve in the frequency domain. If the gain factor is set at frequency 0, for example to the value 1, there remains as the sole free parameter of the Gaussian filter the bandwidth 2 $B_{tx}$ (FIG. 2). FIG. 2 shows the associated amount spectrum.

The amplitude characteristic should have dropped by 3 dB at the frequency f = $B_{tx}$. The following frequency function meets this requirement:

$$S_M(f) = \exp\left\{-\pi\left(\frac{f}{aB_{tx}}\right)^2\right\} \quad (3.1)$$

$$a = \sqrt{\frac{2\pi}{\ln 2}}$$

The inverse Fourier transform of Equation (3.1) provides the following pulse response for the matched filter:

$$S_m(f) \bullet \!\!-\!\!\circ s_m(t) = c \cdot \exp\left\{\frac{-2}{\ln 2} (\pi t B_{tx})^2\right\} \quad (3.2)$$

$$c = \sqrt{\frac{2\pi}{\ln 2}} B_{tx}$$

If one normalizes the time function of Equation (3.2), so that its maximum has the value 1, the following applies:

$$s_m'(t) = \frac{s_m(t)}{c}$$

Figure 3:
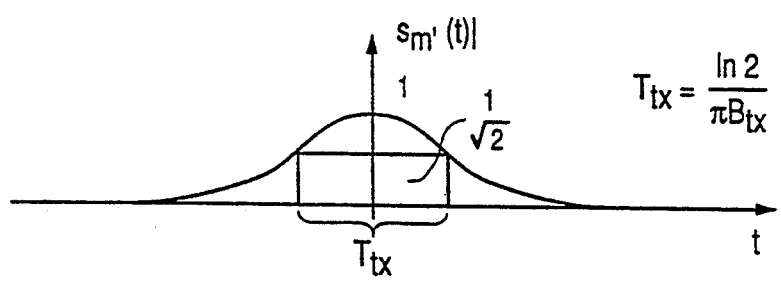
FIG. 3 is a normalized pulse response of the input matched filter (Gaussian filter) of FIG. 2.

FIG. 3 is the associated representation the standardized pulse response of the Gaussian filter with associated 3 dB pulse width $T_{tx}$.

The convolution of this pulse response with itself provides the signal at the output of the matched filter. Correspondingly, the received pulse would be matched optimally and for a received signal with much noise the maximum signal to noise ratio would be obtained. The actually received signal, however, will exhibit greater or smaller deviations from the above assumed ideal shape which will worsen the signal to noise ratio. However, for the analytical treatment of the resolution of two targets it is necessary to have a model concept of the received pulses so that the use of the optimum signal shape as a model is certainly justified. The signal at the output of the matched filter s(t) is then the following:

$$s(t) = \exp\left\{ -\frac{(\pi t B_{tx})^2}{\ln 2} \right\} \quad (3.3)$$

Figure 4:
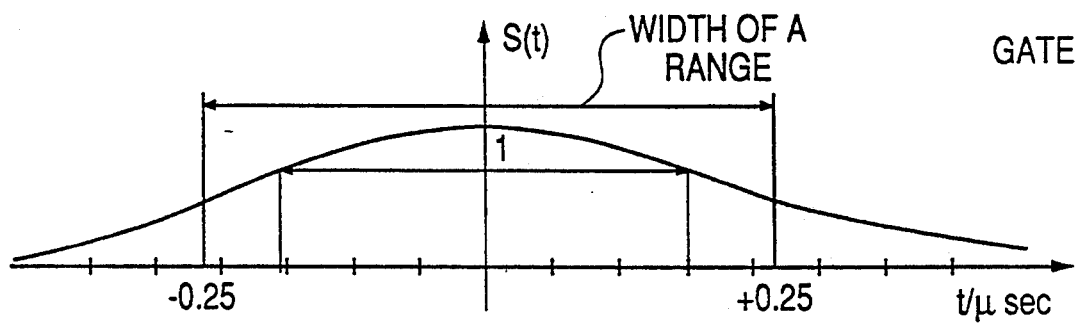
FIG. 4 shows the signal at the output of the input matched filter (Gaussian filter) of FIG. 2 and the expanse of a range gate corresponding to the measuring accuracy.

FIG. 4 shows such a signal s(t) for $B_{tx}=0.5$ MHz and, true to scale, the expanse of a range gate corresponding to the measuring accuracy. The values for the range gate can be found in the mentioned example for the HPRF-VS mode The signal characteristic in the frequency domain is determined, on the one hand, by the length of the signal in the time domain $N_{FFT}/PRF$ and, on the other hand, by the weighting function. The narrowest primary lobe in the frequency domain is produced by a rectangular window in the time domain. The 3 dB bandwidth of the primary lobe is here precisely $N_{FFT}/PRF$, where $N_{FFT}$ is the length of the FFT employed. Any other window function broadens the primary lobe but reduces the height of the side lobes. Consequently, a window function is selected only according to how it behaves in connection with the side lobes in the frequency domain. In the most frequently used window functions the 3 dB width lies at $x\sqrt{PRF/N_{FFT}}$, $1 \leq X \leq 2$. In the illustrations in FIGS. 5 and 6, a Hanning window was employed. The 3 dB width for the frequency and for the corresponding velocity, respectively, is then the following:

$$\Delta f_{3dB} = \frac{1.44 \, PRF}{N_{FFT}} \quad (3.4)$$

$$\Delta v_{3dB} = \frac{0.72 \cdot PRF \cdot \lambda}{N_{FFT}}$$

Figure 5:
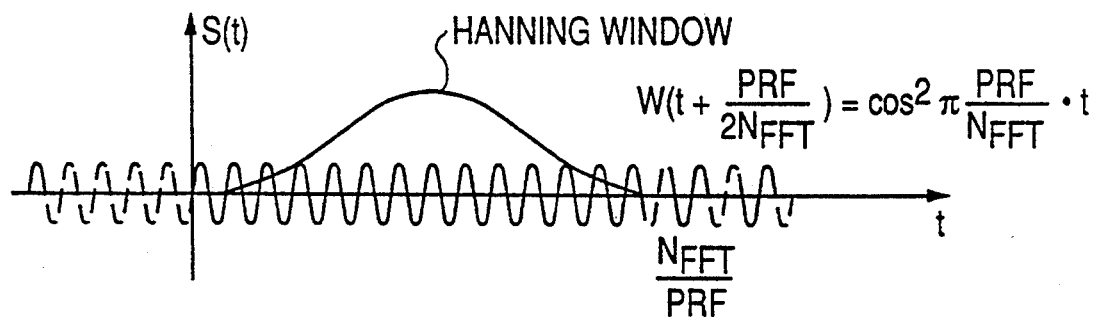
FIGS. 5 and 6 show time signal and frequency spectrum, respectively, of a Hanning window applied to a monochromatic signal.
Figure 6:
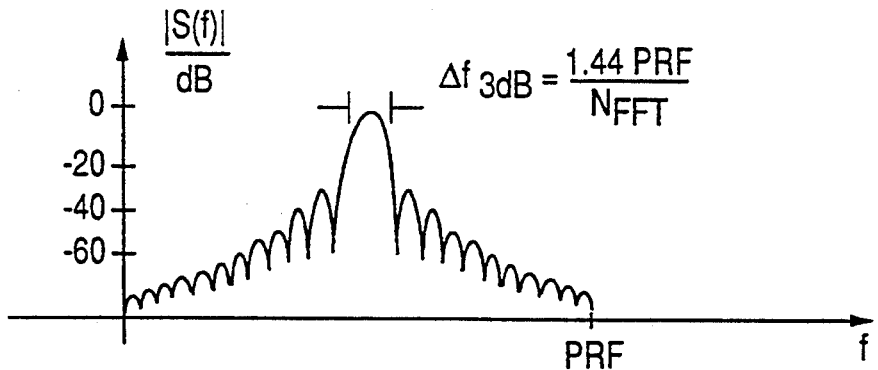

FIG. 5 here shows the time signal and FIG. 6 the associated amplitude spectrum of a weighted monochromatic signal. The transmitted signal $s_t(t)$ of a pulse Doppler radar can be represented as follows:

$$s_t(t) = b(t)e^{j\omega_0 t} \quad (4.1)$$

where b(t) is a function that is periodic in the pulse repetition frequency PRF and $\omega_0$ is the transmitting frequency.

Figure 7:
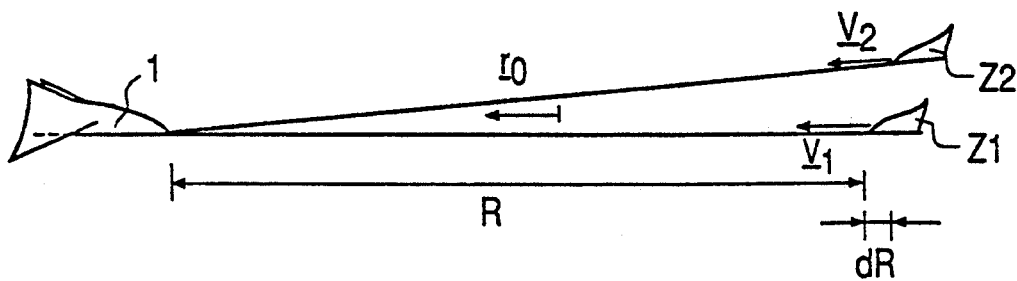
FIG. 7 is a diagram showing an aircraft equipped with Doppler radar being approached by two targets.

If there now is a situation according to FIG. 7 in which an aircraft 1, shown on the left, equipped with pulse Doppler radar encounters two oncoming targets Z1 and Z2 which fly close to one another at almost the same velocities $v_1$ and $v_2$, aircraft receives the following signal $s_r(t)$:

$$s_r(t) = c_1 b(t - T_r)e^{j(2\pi f_0 + 2kv_1 r_0)t + \phi_1} + \quad (4.2)$$

$$c_2 b\left(t - T_r - \frac{2dR}{c}\right)e^{j(2\pi f_0 + 2kv_2 r_0)t + \phi_2}$$

where $$T_r = \frac{2R}{c}, \, dv = v_2 r_0 - v_1 r_0,$$

$$f_{D1} = \frac{2v_1 r_0}{\lambda} \text{ and } f_{D2} = \frac{2v_2 r_0}{\lambda}$$

Equation (4.2) is composed of two additively superimposed components, with $c_1$ and $c_2$ representing the amplitudes of the two reflection components. Both terms differ in the Doppler frequency and in the delay time by only the differential components dR and dv. It is also important that both targets generate random phases $\phi_1$ and $\phi_2$ which, moreover, are not at all correlated with one another. These two phases remain in effect during demodulation with $e^{-j2\pi f_0 t}$ since the initial phase in the demodulator can be set to zero as follows without limiting the general system:

$$s_D(t) = s_r(t) \cdot e^{-j2\pi f_0 t} = c_1 b(t - T_r)e^{j(2\pi f_{D1} t + \phi_1)} + \quad (4.3)$$

$$c_2 b\left(t - T_r - \frac{2dR}{c}\right)e^{j(2\pi (f_{D1} + df)t + \phi_2)}$$

The Fourier transform of Equation (4.3) becomes the following:

$$S_D(f) = c_1 e^{j\phi_1} B(f - f_{D1})e^{-j2\pi f T_r} + \quad (4.4)$$

$$c_2 e^{j\phi_2} B(f - f_{D1} - df)e^{-j2\pi f(T_r + \frac{2dR}{c})}$$

where B(f) resulted from b(t) ●—O B(f). If the Fourier transform is approximated by a discrete Fourier transform (DFT), the following discrete spectrum is obtained at the spectral points i:

$$i\Delta f = f \quad (4.5)$$

In the frequency domain, the shift in time $T_r$ or, in other words, the delay time of the signal produces a phase that rises linearly with the frequency, with the rise, that is, the group delay, being directly proportional to the target distance. Under the assumption that this phase term changes only very little from sampling point to sampling point, the following is obtained:

$$2\pi i \Delta f T_r = 2\pi T_r \frac{PRF}{N_{FFT}} \quad (4.6)$$

where $$2\pi T_r \frac{PRF}{N_{FTT}} << \pi$$

Then the spectrum can be expressed as follows without limiting the general system:

$$S_D(f) = c'_1 e^{j\phi_1} B(f - f_{D1}) + c'_2 e^{j\phi_2} B(f - f_{D1} - df) \quad (4.7)$$

Figure 8:
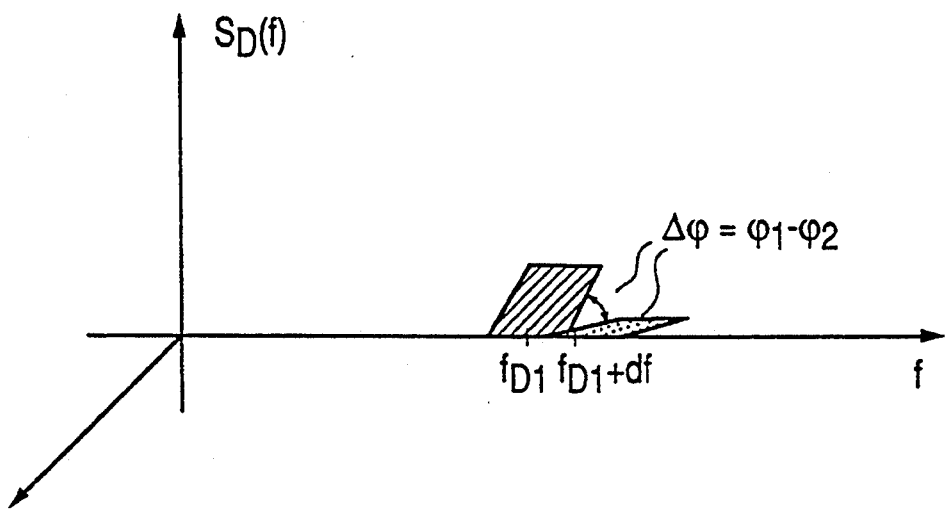
FIG. 8 depicts the spectrum of two targets that are in close proximity to one another but differ considerably in phase.

This equation is valid since the spectrum B(f) extends over only a few sampling values. FIG. 8 is intended to point out the importance of the two phase values $\phi_1$ and $\phi_2$ of Equation (4.7). For this purpose, FIG. 8 depicts the spectrum of two targets that are in close proximity to one another but differ considerably in phase.

Figure 9:
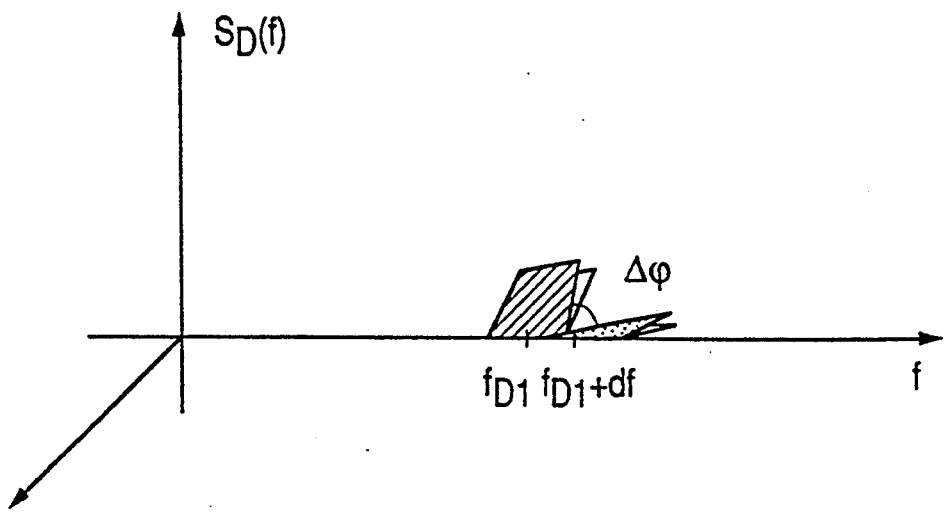
FIG. 9 shows the spectra of two targets where the phase changes linearly.
Figure 10A:
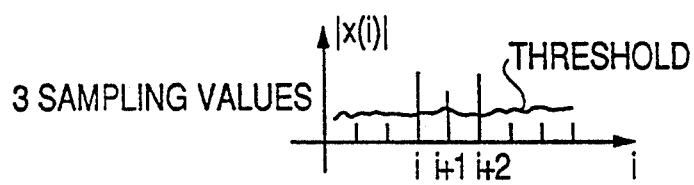
FIGS. 10A–10H show different cases where an evaluation of the amplitude is sufficient to detect a multiple target situation.
Figure 10B:
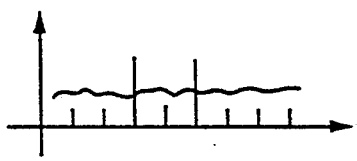
Figure 10C:
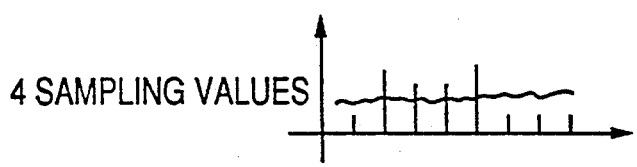
Figure 10D:
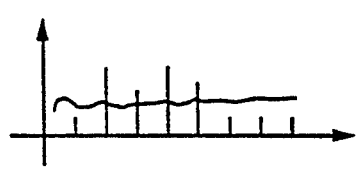
Figure 10E:
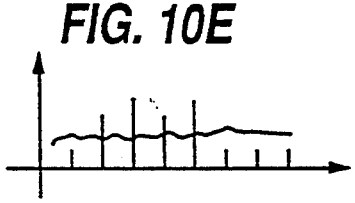
Figure 10F:
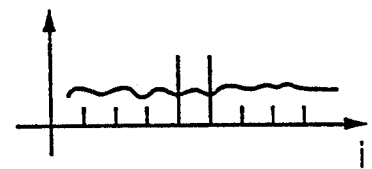
Figure 10G:
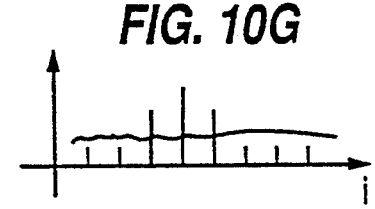
Figure 10H:
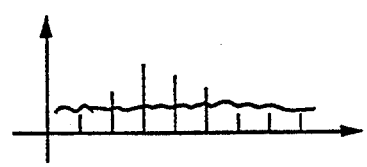

If the condition of Equation (4.6) does not apply, the phase continues to shift further along the spectrum by a certain amount. The continuation of the phase shift depends on the distance of the target according to Equation (4.4). This effect is shown in FIG. 9 which shows the spectra of two targets where the phase changes linearly.

FIG. 10 shows different cases in which an evaluation of the amplitude is sufficient to discover a multiple target situation. Prerequisite for such a resolution is that the number of filters or distance gates employed is greater than two. If there are three filters or distance gates x(i), x(i+1), and x(i+2) in juxtaposition, a conclusion that there is a multiple target situation is drawn if precisely the following applies:

$$\{|x(i+1)| < |x(i)|\} \wedge \{|x(i+1)| < |x(i+2)|\}$$

$$|x(i+1)| < \lambda(i+1) \quad (5.1)$$

where $\lambda(i+1)$ is the threshold at location i+1, that is, whenever either the middle value has the lowest amplitude or does not exceed the threshold. For a succession of four filters or range gates x(1), x(i+1), x(i+2) and x(i+3), which all exceed the threshold, the condition for a multiple target decision is the following:

$$\{\max(|x(i+1)|, |x(i+2)|) < \min(|x(i)|, |x(i+3)|)\} \quad (5.2)$$
$$\{|x(i+1)| < \min(|x(i)|, |x(i+2)|)\}$$
$$\{|x(i+2)| < \min(|x(i+1)|, |x(i+3)|)\}$$

where $\triangle$ is a logic AND and $\triangledown$ is a logic OR. If the conditions of (5.1) and (5.2) are not met, the phase is utilized additionally for evaluation. The expansion of condition (5.2) to a situation involving five or more filters or range gates in juxtaposition is not particularly difficult and will not be laid out here explicitly.

Figure 11:
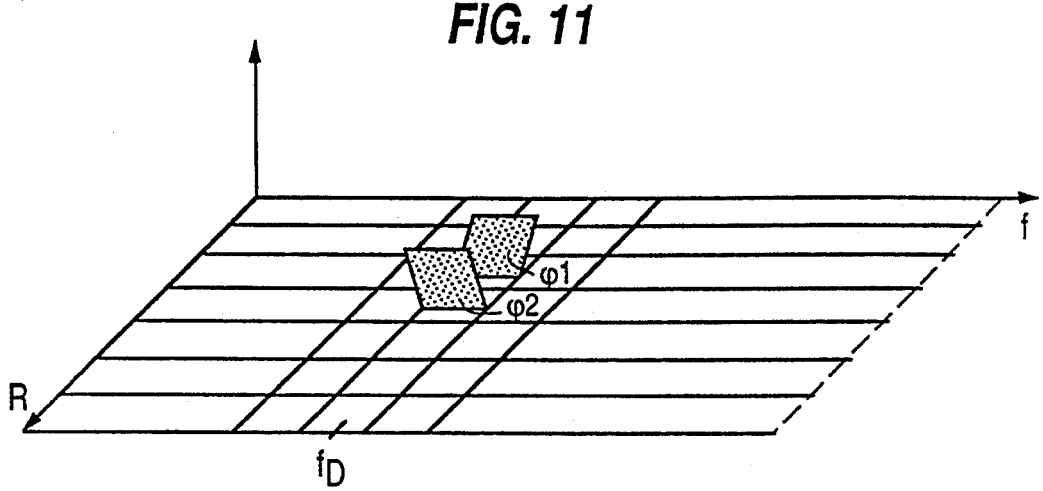
FIG. 11 shows two targets as models which have exactly the same velocity and thus the same Doppler shift but appear in two adjacent range gates.

FIG. 11 shows two targets as models which have exactly the same velocity and thus the same Doppler shift but appear in two adjacent range gates.

Two cases must now be distinguished: one target is split onto two range gates, or two targets appear in two adjacent range gates. This is possible only with the aid of the two phase values $\phi_1$ and $\phi_2$ belonging to the targets. Initially the single target situation is examined and Equation (4.3) is used to obtain the corresponding time signal:

$$s_{D1}(t) = c_1 b(t - T_r) e^{j(2\pi f_{D1} t + \phi_1)} \quad (5.3)$$

If this signal is sampled at sampling time $T_a$, the time t in the exponent can be replaced by the following expression:

$$t = iT_a = i \cdot \frac{2\Delta R}{c} \quad (5.4)$$

-continued $$s_{D1}(iT_a) = c_1 \cdot b(iT_a - T_r) e^{j(\frac{4\pi \Delta R}{c} f_{D1} \cdot i + \phi_1)}$$

Accordingly, due to the Doppler velocity of the target, the phase shifts from distance gate to range gate by the following $\Delta\phi$:

$$\Delta\phi(f_{D1}) = \frac{4\pi \Delta R}{c} f_{D1} \quad (5.5)$$

Figure 12:
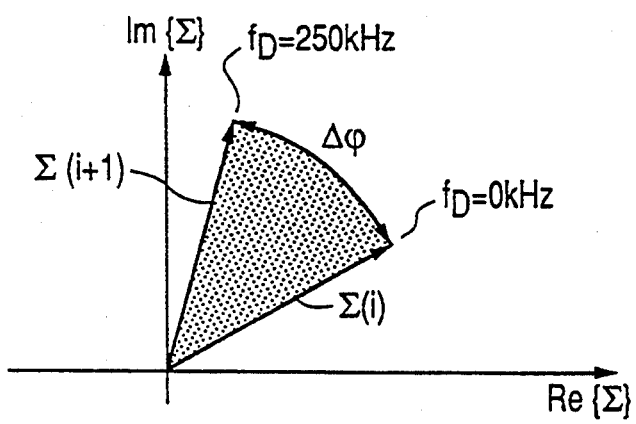
FIG. 12 is a plot of the phase shift limits from rang gate to range gate in a single target appearing in two adjacent range gates example.

This phase shift is proportional to the Doppler shift $f_{D1}$. Since the Doppler frequency is known very precisely, a corresponding correction can be introduced into the resolution algorithm. For the data of the above mentioned example, the phase shift lies within the following limits:

$$\Delta R = 75 \text{ m}$$
$$0 \leq f_D \leq 250 \text{ kHz}$$
$$\rightarrow 0° \leq \Delta\phi \leq 45°$$

and, in the extreme case, may be 785 mrad or 45°. These facts are shown in FIG. 12. The mentioned correction must thus calculate the value $\Delta\phi$ which is a function of the Doppler frequency and must then generate in the adjacent range gate a signal value that corresponds to a single target situation as follows:

$$\Sigma' = \Sigma(i)e^{j\Delta\phi}$$

$$\Sigma' = \begin{pmatrix} Re\{\Sigma\}\cos\Delta\phi - Im\{\Sigma\}\sin\Delta\phi \\ Re\{\Sigma\}\sin\Delta\phi + Im\{\Sigma\}\cos\Delta\phi \end{pmatrix}$$

Figure 13:
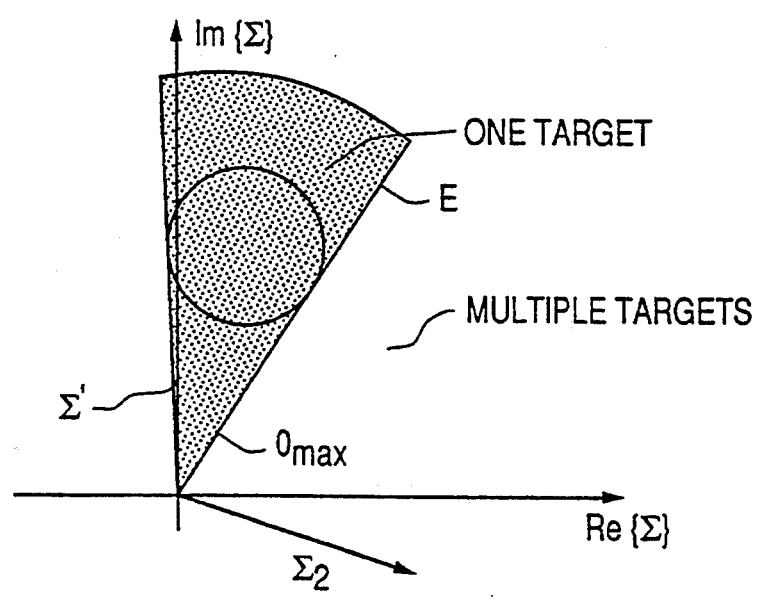
FIG. 13 shows an angle sector around a corrected value Σ'.

This value $\Sigma'$ must be compared with the actual complex value $\Sigma(i+1)$ of the range gate adjacent to $\Sigma(i)$. If, for example, a minimum signal to noise ratio of 10 dB is selected, that is, the following:

$$SNR = 10 \log \frac{|\Sigma'|^2}{\sigma_n^2} \stackrel{!}{=} 10 \text{ dB} \quad (5.7)$$

an angle sector around the corrected value $\Sigma'$ results. This is shown in FIG. 13.

The maximum half width $\theta_{max}$ of the sector is here a function of the signal to noise ratio SNR.

This angle range is the decision area E for a single target situation, that is, all targets within this decision area are evaluated as individual targets. Targets lying in the angle range complementary thereto, that is, outside of the decision area, are evaluated as multiple target situations (composed of several individual targets). The maximum width $2\theta_{max}$ of decision area E results from the following equation:

$$\sin \theta_{max} = \frac{\sigma_n}{|\Sigma'|} = \frac{1}{\sqrt{10}} \quad (5.8)$$

This is based on a signal to noise ratio of 10 dB. Equation (5.8) solved for $\theta_{max}$ provides the following:

$$\theta_{max} = 18.5 \quad (5.9)$$

The decision area for a target is thus delimited by the following angle sector:

$$-\theta_{max} < \arg \Sigma' - \arg \Sigma(i+1) < \theta_{max} \quad (5.10)$$

In order to avoid the inverse trigonometric functions, the following relationship is employed:

$$\phi = \arg \Sigma'(i) \sim - \arg \Sigma(i+1) \quad (5.11)$$

$$\cos\phi = \frac{\Sigma'(i)\sim \cdot \Sigma(i+1)}{|\Sigma'(i)| \cdot |\Sigma(i+1)|}$$

Finally, the value in Equation (5.9) provides the following distinguishing feature for a multiple target situation:

$$\frac{\Sigma'(i)' \cdot \Sigma(i+1)}{|\Sigma'(i)| \cdot |\Sigma(i+1)|} \begin{matrix} \text{one target} \\ > \\ -0.95 \\ < \\ \text{two targets} \end{matrix} \quad (5.12)$$

Figure 14:
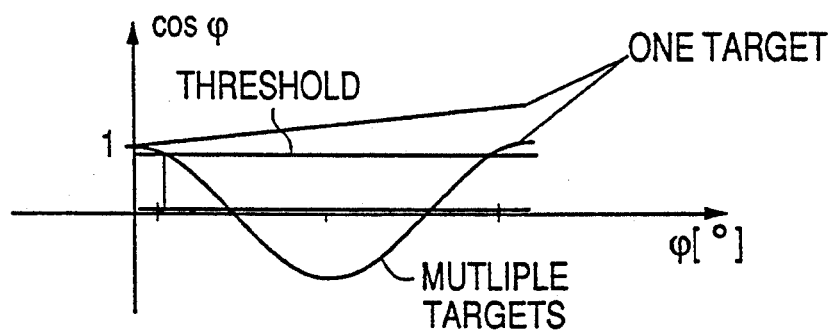
FIG. 14 is a plot of the cosine of the phase angle φ for single target and multiple target situations.

These facts are shown in FIG. 14. Very difficult to calculate analytically is the probability $P_{F2}$ that a single target situation is declared as a multiple target situation. $P_{F2}$ is given by the following integral:

$$P_{F2}(\theta_{max}) = \quad (5.13)$$

$$\int_{\arg\Sigma' - \theta_{max}}^{\arg\Sigma' + \theta_{max}} \int_0^\infty f_{r,\phi}(r,\phi|\text{single target}) dr\, d\phi \sim = \text{constant}$$

The conditional density function underneath the integral sign is a Gauss curve. The false alarm probability can be calculated numerically.

Figure 15:
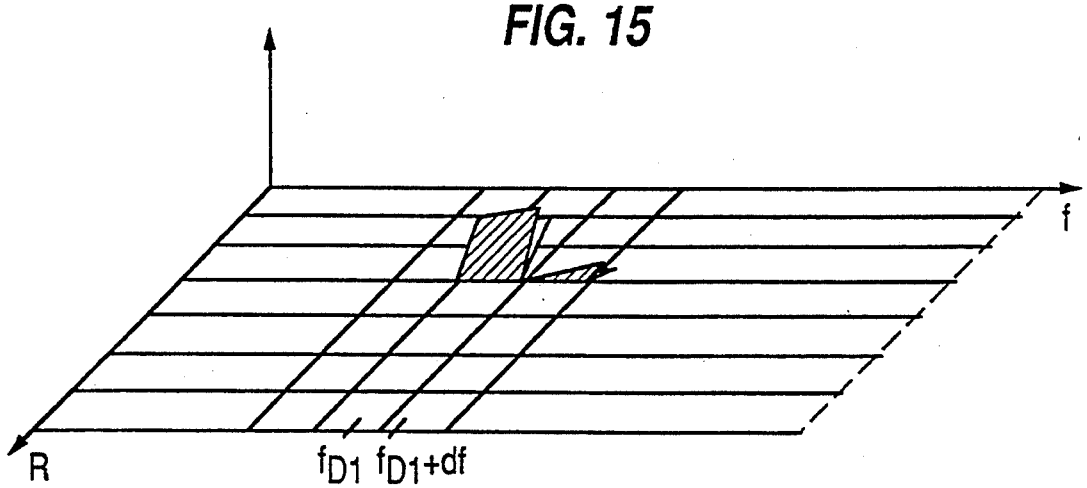
FIG. 15 shows two targets which are at exactly the same distance but differ by a differential value df in the Doppler direction, and shows that the phase of each target continues to shift along the Doppler direction.

FIG. 15 shows two targets which are at exactly the same distance but differ by a differential value df in the Doppler direction.

FIG. 15 further shows that the phase of each target continues to shift along the Doppler direction. In this case, the single situation is again examined for the Doppler signal. According to Equation (4.4), the following then applies:

$$S_{D1}(f) = c_1 e^{j\phi_1} B(f-f_{D1}) e^{-j2\pi f T_r} \quad (5.14)$$

This time, sampling takes place in the frequency domain.

With $$f = i\Delta f = i\frac{PRF}{N_{FFT}} \text{ and } T_r = \frac{2R}{c} \quad (5.15)$$

the following applies:

$$S_{D1}(i\Delta f) = c_1 e^{j\phi_1} e^{-2j\pi i\Delta f \frac{2R}{c}} \cdot B(i\Delta f - f_{D1})$$

Here again the phase continues to shift from sampling value to sampling value. This time, however, the distance, that is, the delay, of the signal is responsible for it. Thus, the following phase difference $\Delta\phi(R)$ results between the individual Doppler filters:

$$\Delta\phi(R) = \frac{4\pi R}{c} \cdot \frac{PRF}{N_{FFT}} \quad (5.16)$$

The difference from the preceding example is that the distance is not known and therefore no correction can be made. In our example for the HPRF-VS mode, the following is obtained for the phase shift:

$$PRF = 250 \text{ kHz}, R_{max} = 225 \text{ km}, N_{FFT} = 2048$$
$$0 \leq R \leq R_{max}$$
$$\to 0° \leq \Delta\phi \leq 65°$$

For a maximum distance of 225 km the phase shifts by 65 or 1.13 rad.

Figure 16:
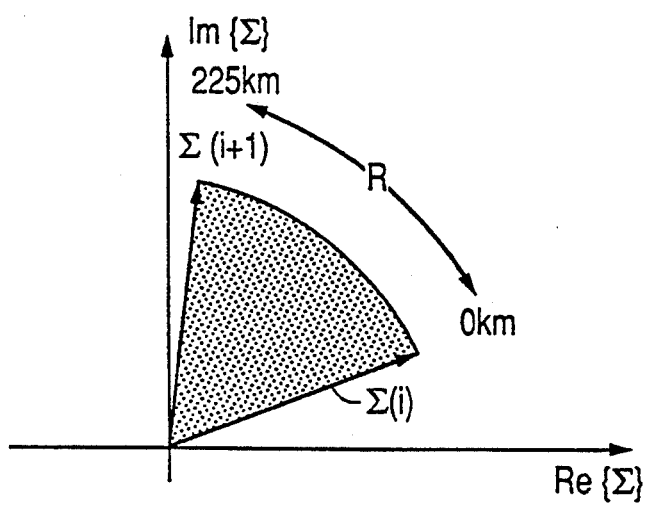
FIG. 16 shows the relationship between the phase shifts of two adjacent Doppler filters and the distance.

FIG. 16 shows the relationship between the phase shifts of two adjacent Doppler filters and the distance.

Since the distance is not known, the vector $\Sigma(i)$ is turned precisely into the center of the sector shown in FIG. 16. This is accomplished as follows by a complex multiplication with $e^{j32.50°}$:

$$\Sigma' = \Sigma \cdot e^{j32.5°} \quad (5.17)$$

$$= \begin{pmatrix} Re\{\Sigma\}\cos 32.5° - Im\{\Sigma\}\sin 32.5° \\ Re\{\Sigma\}\sin 32.5° + Im\{\Sigma\}\cos 32.5° \end{pmatrix}$$

$$= \begin{pmatrix} Re\{\Sigma\} \cdot 0.843 - Im\{\Sigma\} \cdot 0.537 \\ Re\{\Sigma\} \cdot 0.537 + Im\{\Sigma\} \cdot 0.843 \end{pmatrix}$$

Figure 17:
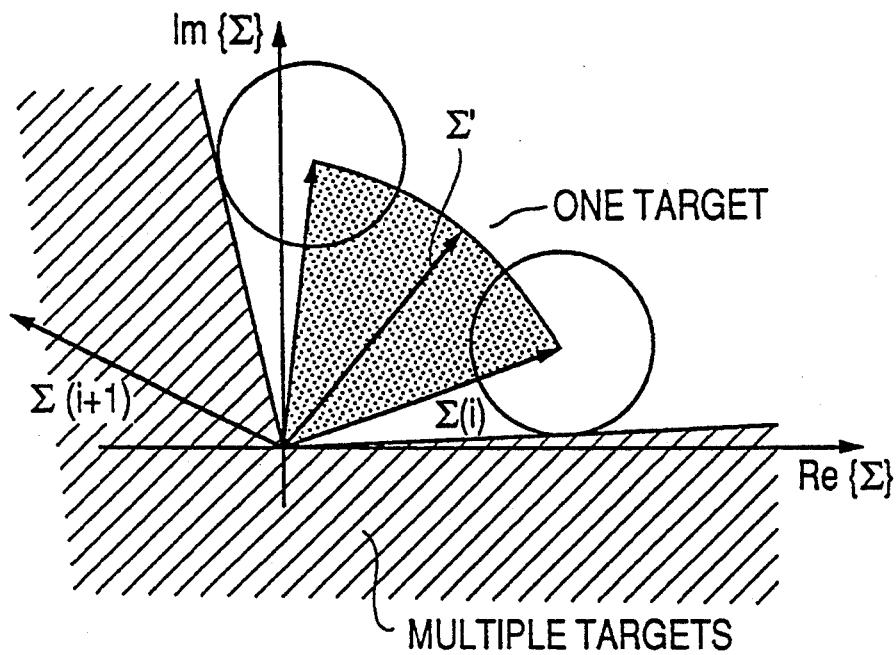
FIG. 17 show the sector of FIG. 16 expanded to show a resulting sector that is symmetrical around E, and serves as a decision area for a single target situation.

A signal to noise ratio of 10 dB is now assumed again. According to FIG. 17, a sector thus results that is symmetrical around $\Sigma'$ and serves as a decision area for a single target situation. For this purpose, the sector shown in FIG. 16 was expanded to the right and left by $\theta_{max} = 18.5°$ according to Equation (5.9). The following then applies for the angle limits of the sector:

$$-\theta_{max} - 32.5° < \arg\Sigma'(i) - \arg\Sigma'(i+1) < \theta_{max} + 32.5°$$

$$-51° < \arg\Sigma'(i) - \arg\Sigma'(i+1) < 51° \quad (5.18)$$

Here again Equation (5.11) can be employed and thus the inverse trigonometric functions can be avoided. However, this is possible only because the vector $\Sigma'(i)$ was placed in the middle of the decision area and thus conditions corresponding to the cosine function were created. The sector for a single target situation thus extends ±51° around the argument of $\Sigma'(i)$. Converted, this results in the following for the decision criterion:

$$\frac{\Sigma'(i)' \cdot \Sigma(i+1)}{|\Sigma'(i)| \cdot |\Sigma(i+1)|} \begin{matrix} \text{one target} \\ > \\ -0.63 = \cos(51°) \\ < \\ \text{multiple targets} \end{matrix} \quad (5.19)$$

If the distance R is known, the phase shift between two adjacent Doppler filters can be accurately calculated in advance. Employing Equation (5.16), the following then applies:

$$\Delta\phi(R) = \frac{4\pi R \cdot PRF}{c N_{FFT}} \quad (5.20)$$

Consequently, the complex vector can be rotated further about the phase corresponding to the distance as follows:

$$\Sigma' = \Sigma e^{j\Delta\phi(R)} \quad 5.21$$

$$\Sigma' = \begin{pmatrix} Re\{\Sigma\}\cos\Delta\phi - Im\{\Sigma\}\sin\Delta\phi \\ Re\{\Sigma\}\sin\Delta\phi + Im\{\Sigma\}\cos\Delta\phi \end{pmatrix}$$

The determination of the decision area for a multiple target situation now takes place according to the above. With an exemplary signal to noise ratio of 10 dB, the sector in which the hypothesis is made for a single target situation is limited by the following angle values:

$$-\theta_{max} < \arg\Sigma' = \arg\Sigma(i+1) < \theta_{max} \quad (5.22)$$
$$\theta_{max} = 18.5° \text{ for } SNR = 10 \text{ dB}$$

Figure 18:
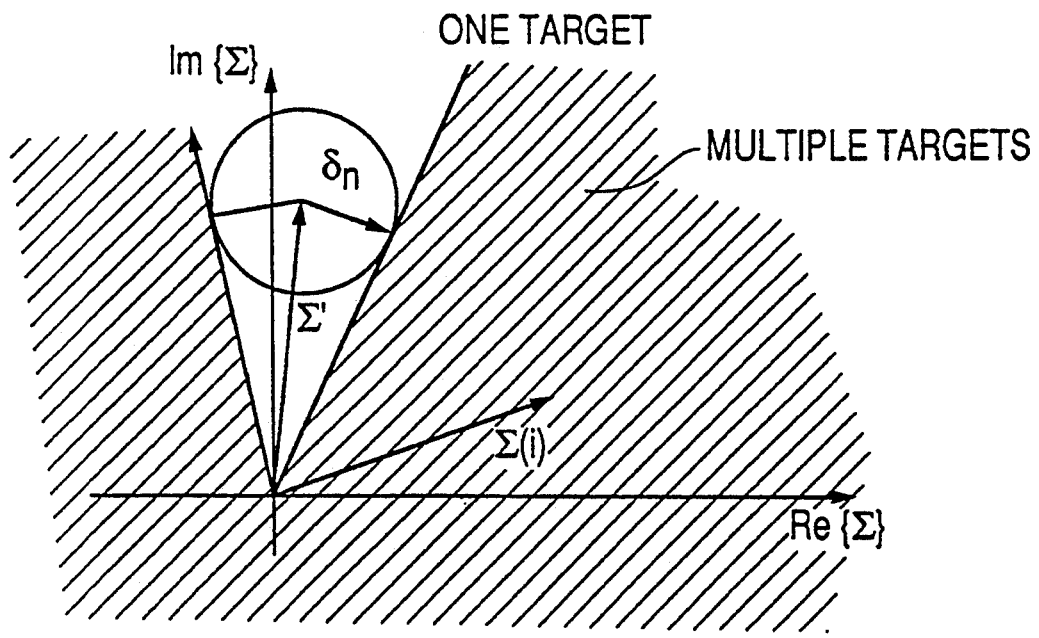
FIG. 18 shows the limitation of the sector in which the hypothesis is made for a single target situation.

These facts are shown in FIG. 18. The decision criterion for a multiple target situation or a single target situation is identical with Equation (5.12):

$$\frac{\Sigma'(i) \cdot \Sigma(i+1)}{|\Sigma'(i)| \cdot |\Sigma(i+1)|} \begin{array}{c}\text{one target}\\ > \\ -0.95 \\ < \\ \text{two targets}\end{array} \quad (5.19)$$

The vectors $\Sigma'(i)$ and $\Sigma(i+1)$ here do not lie next to one another in the distance direction but in the Doppler direction. This decision criterion is shown in FIG. 14.

FIGS. 19 to 22 show embodiments explaining the resolution capability of an HPRF radar under various conditions.

Figure 19A:
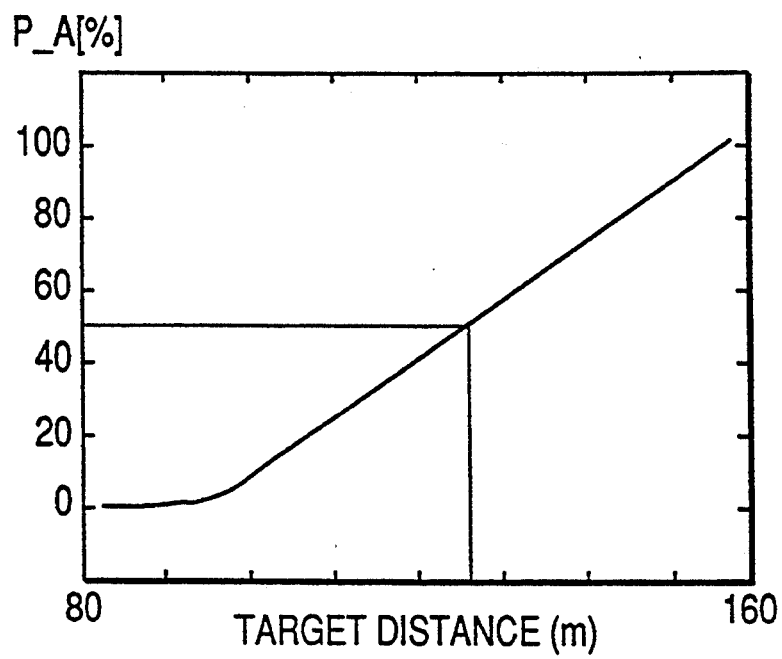
FIGS. 19A and 19B show the resolution probability for two targets in the distance direction.
Figure 19B:
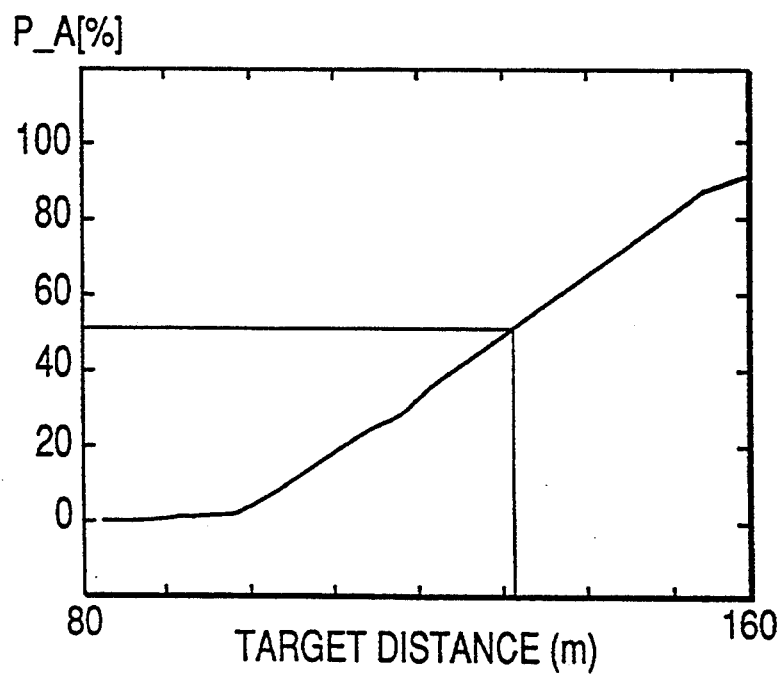

FIGS. 19A and 19B show the resolution probability for two targets in the range direction. Only the amplitudes superimposed from both targets are evaluated in the reflected signals. Both targets here have precisely the same Doppler velocity of approximately 300 m/s, the same backscatter cross section, which results in the same amplitudes, and an average distance of approximately 50 km. The HPRF radar operates with a transmitting wavelength of approximately 3.5 cm. The transmitted pulse length (sampling time) corresponds to a range gate length of approximately 75 m, the bandwidth $B_{tx}$ of the matched filter at the input of the receiving branch is $B_{tx}=0.85$ MHz. FIG. 19A shows the detection probability P A (in %) as a function of the target distance (in m), that is, the distance between the targets to be detected at the mentioned average distance. A signal to noise ratio of 40 dB was here assumed to exist at the output of the matched filter. FIG. 19A shows that, with a detection probability of 50%, two targets can still be distinguished as two targets at a minimum target distance of approximately 112 m.

The example according to FIG. 19B differs from that of FIG. 19A only in that the mentioned signal to noise ratio is 25 dB. Even under these conditions, the minimum target distance is increased only by approximately 10 m to approximately 122 m.

Figure 20A:
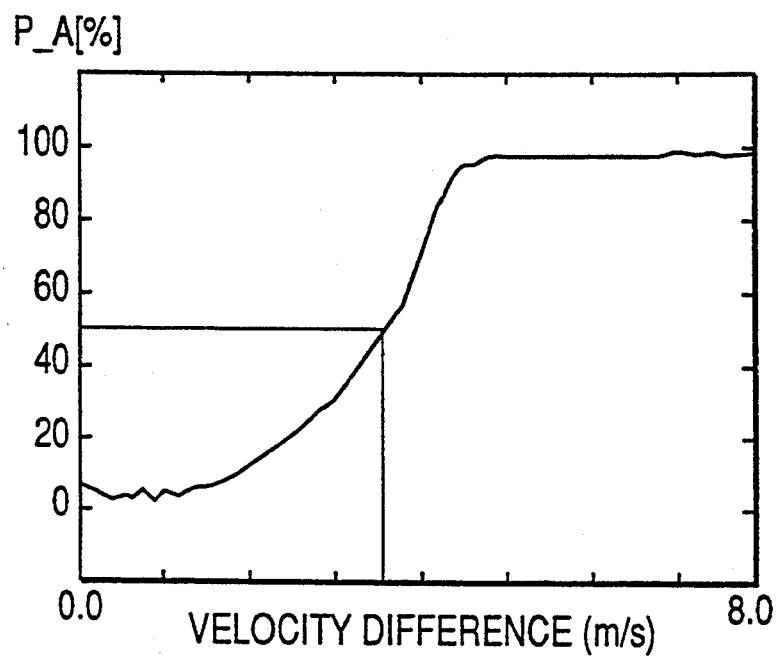
FIGS. 20A and 20B depict the resolution probability for two targets in the velocity direction.
Figure 20B:
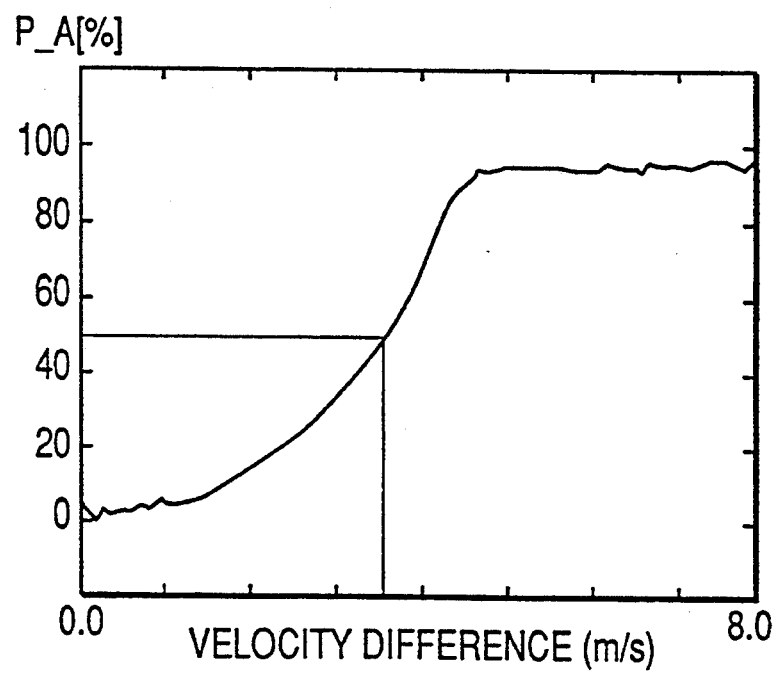

FIGS. 20A and 20B depict the resolution probability for two targets in the velocity direction. As in FIGS. 19, only the amplitude of the sum signal of the reflected targets is evaluated. Both targets are at exactly the same distance of about 50 km with an average velocity of approximately 300 m/s and the same backscatter cross sections. The length of the FFT was: $N_{FFT}=2048$, the pulse repetition frequency was: PRF=250 KHz. A Hanning window was employed for weighting. In FIG. 20A, a signal to noise ratio of 40 dB exists at the output of the matched filter. The 50% detection probability for the targets here corresponds to a difference in velocities of approximately 3.33 m/s. With a signal to noise ratio of 10 dB (FIG. 20b), almost the same velocity resolution exists.

FIGS. 21A, 21B and 22A, 22B correspond to FIGS. 19A, 19B and 20A, 20B, respectively, with the difference, however, that in addition to the amplitude (amount) the phase is also evaluated.

Figure 21A:
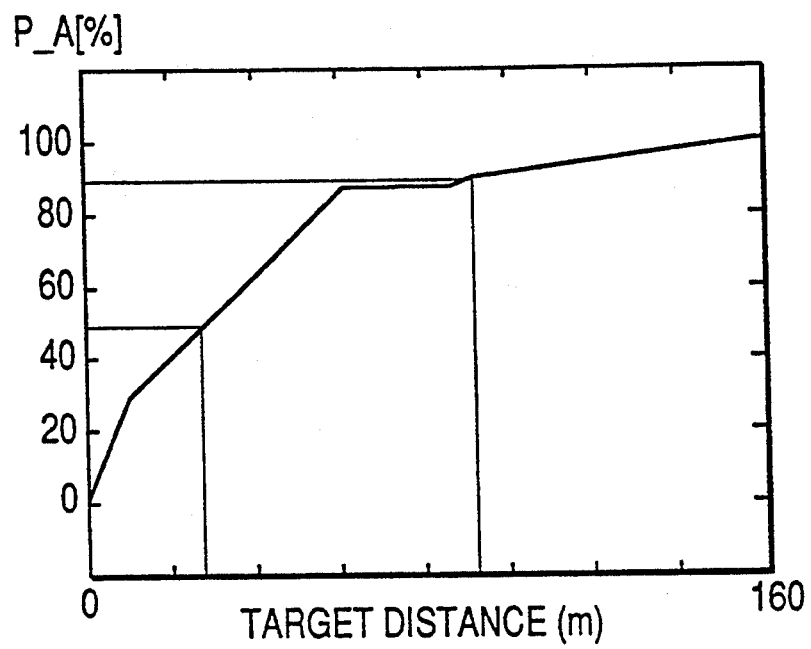
FIGS. 21A, 21B and 22A correspond to FIGS. 19A, 19B and 20A, 20B, respectively, with the difference, however, that in addition to the amplitude the phase is also evaluated.
Figure 21B:
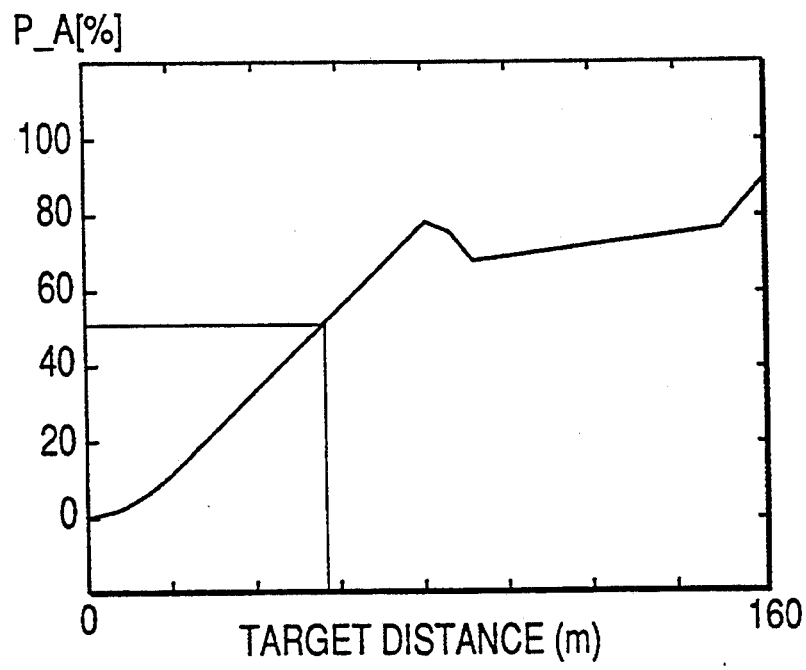

In FIG. 21A, the parameters correspond to those of FIG. 19A. The signal to noise ratio is 40 dB. The figure shows that the 50% detection probability has dropped to a target distance of approximately 25 m. With a signal to noise ratio of 25 dB (FIG. 21b), this target distance is increased again to approximately 52 m.

Figure 22A:
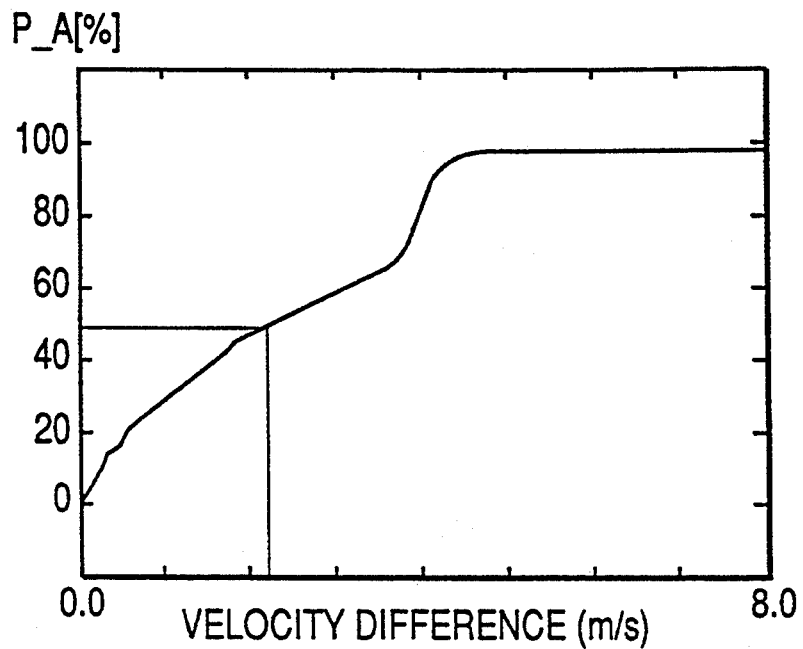
Figure 22B:
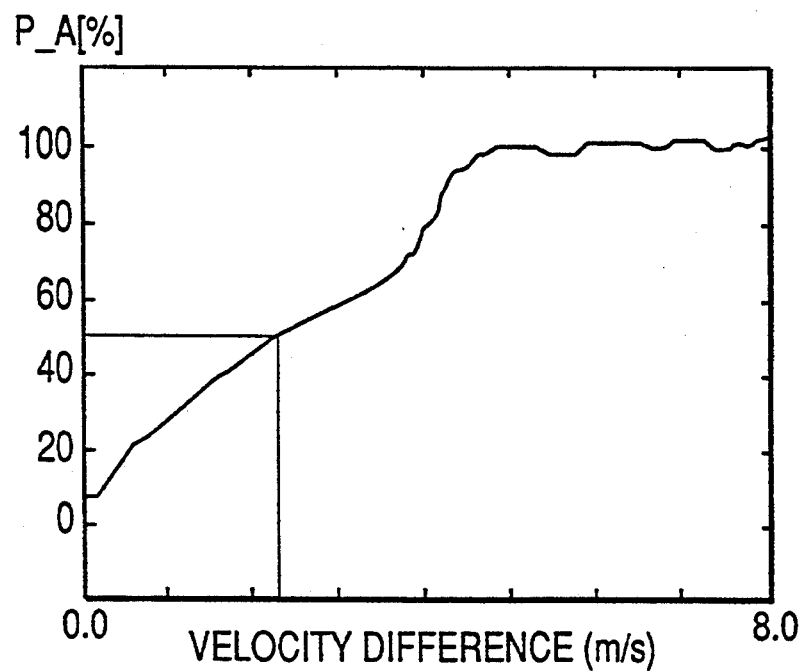
Figure 23:
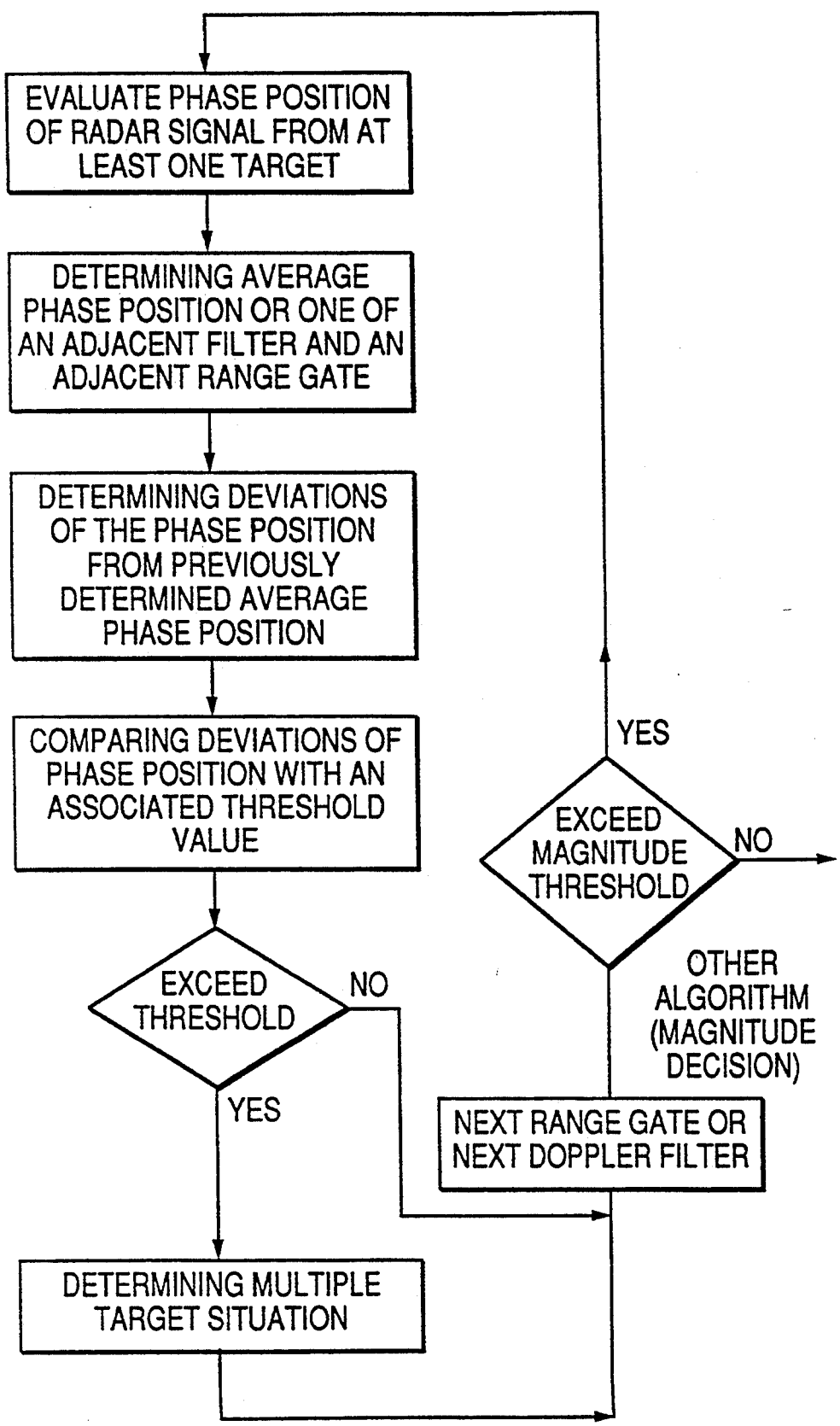
FIG. 23 is a flow chart of an embodiment of the invention.

In FIG. 22A the parameters correspond to those of FIG. 20A. The signal to noise ratio is 40 dB. It can be seen that the 50% detection probability has dropped to a velocity difference of approximately 2.1 m/s. Advantageously, this minimum velocity difference remains advantageously in existence also at considerably lower signal to noise ratios, for example, at 25 dB corresponding to FIG. 22B.

The present invention is not limited to the described embodiments but can be employed just as well for others, for example, for pulse Doppler radars operating according to the MPRF or LPRF method. (MPRF = medium pulse repetition frequency, LPRF = low pulse repetition frequency)

What is claimed is:

1. A method for distinguishing between at least two targets with the aid of a pulse Doppler radar, wherein radar signals reflected from at least one target are evaluated with respect to at least one of their distance direction and their velocity direction, whereupon a conclusion is drawn as to the existence of one or a plurality of targets, comprising:

evaluating the phase position of a radar signal reflected from at least one target;

determining from the evaluated phase position an average phase position for one of an adjacent filter and an adjacent range gate, respectively;

determining deviations of the phase position of the adjacent filter or the adjacent range gate, respectively, from the previously determined average phase position; and comparing the deviations of the phase position with an associated threshold value and determining a multiple target situation if the deviations of the phase position exceed the associated threshold value.

2. A method as defined in claim 1, wherein the threshold value is determined based on the signal to noise ratio of a received signal after it passes through a weighting filter.

3. A method as defined in claim 2, wherein the weighting filter is as a Gauss filter.

4. A method as defined in claim 1, wherein an average phase position for each Doppler range is formed in an adjacent Doppler filter.

5. A method as defined in claim 1, wherein an average phase position for each range gate is formed in the adjacent range gate.

6. A method as defined in claim 5, further comprising evaluating deviations of the phase positions with respect to the average phase positions and, if an associated threshold is exceeded, determining that a multiple target situation exists.

7. A method as defined in claim 1, wherein the pulse Doppler radar operates according to the High Pulse Repetition Frequency mode.

8. A method as defined in claim 1, wherein the pulse Doppler radar is configured for use as an on-board radar in an aircraft.

* * * * *